(12) United States Patent  
Montagnon et al.

(10) Patent No.: US 7,812,713 B2
(45) Date of Patent: Oct. 12, 2010

(54) DEVICE FOR MEASURING SPEED, PARTICULARLY FOR CYCLES

(75) Inventors: Bruno Montagnon, Les Ollières (FR); Gilles Parquet, Menthonnex en Bornes (FR)

(73) Assignee: Salomon S.A.S., Metz-Tessy (FR)

( * ) Notice: Subject to any disclaimer, the term of this patent is extended or adjusted under 35 U.S.C. 154(b) by 439 days.

(21) Appl. No.: 11/771,432

(22) Filed: Jun. 29, 2007

(65) Prior Publication Data

US 2008/0122596 A1    May 29, 2008

(30) Foreign Application Priority Data

Jul. 3, 2006    (FR) .................................. 06 06074

(51) Int. Cl.
*B62J 3/00* (2006.01)
*B62J 6/00* (2006.01)
*G01P 3/48* (2006.01)
*G01P 3/54* (2006.01)
*A61H 3/04* (2006.01)

(52) U.S. Cl. ...................... 340/432; 324/167; 280/200; 340/693.9

(58) Field of Classification Search ................. 340/432, 340/693.9; 280/200; 324/167
See application file for complete search history.

(56) References Cited

U.S. PATENT DOCUMENTS 4,179,935 A * 12/1979 Huret ........................... 73/493
4,331,918 A * 5/1982 Dunch ......................... 324/174
5,170,161 A * 12/1992 Sakurai ................... 340/870.3
5,177,432 A    1/1993  Waterhouse et al.
5,312,166 A    5/1994  Nagano
6,490,507 B1  12/2002  Campagnolo
6,779,401 B2   8/2004  Montagnon
7,055,394 B2 * 6/2006  Kinoshita ..................... 73/856

FOREIGN PATENT DOCUMENTS

| DE | 199 56 475 A1 | 7/2000 |
| DE | 203 04 256 U1 | 8/2003 |
| EP | 0 582 728 A1 | 2/1994 |
| FR | 2 458 811 A1 | 1/1981 |
| FR | 2 816 277 A1 | 5/2002 |
| GB | 2 056 684 A | 3/1981 |

* cited by examiner

*Primary Examiner*—Benjamin C Lee
*Assistant Examiner*—Cal Eustaquio
(74) *Attorney, Agent, or Firm*—Greenblum & Bernstein, P.L.C.

(57) ABSTRACT

Device for measuring speed of a cycle having a frame, at least one wheel, a fastening axle about which the wheel is adapted to rotate, and a nut adapted to be threaded upon a threaded portion of the axle. The device includes a mechanism for detecting the rotation of the wheel, the device including a fixed sensor mounted on a portion of the cycle frame, adapted to detect the passing of an associated movable sensor element fixed for movement to the wheel, as well as a signal processor for processing the signal generated by the fixed sensor. At least one of, or both, the fixed sensor and the signal processor are housed in a casing fixed to the nut of the fastening axle for the wheel. The casing is fixed to an arm extending radially from the nut.

25 Claims, 5 Drawing Sheets

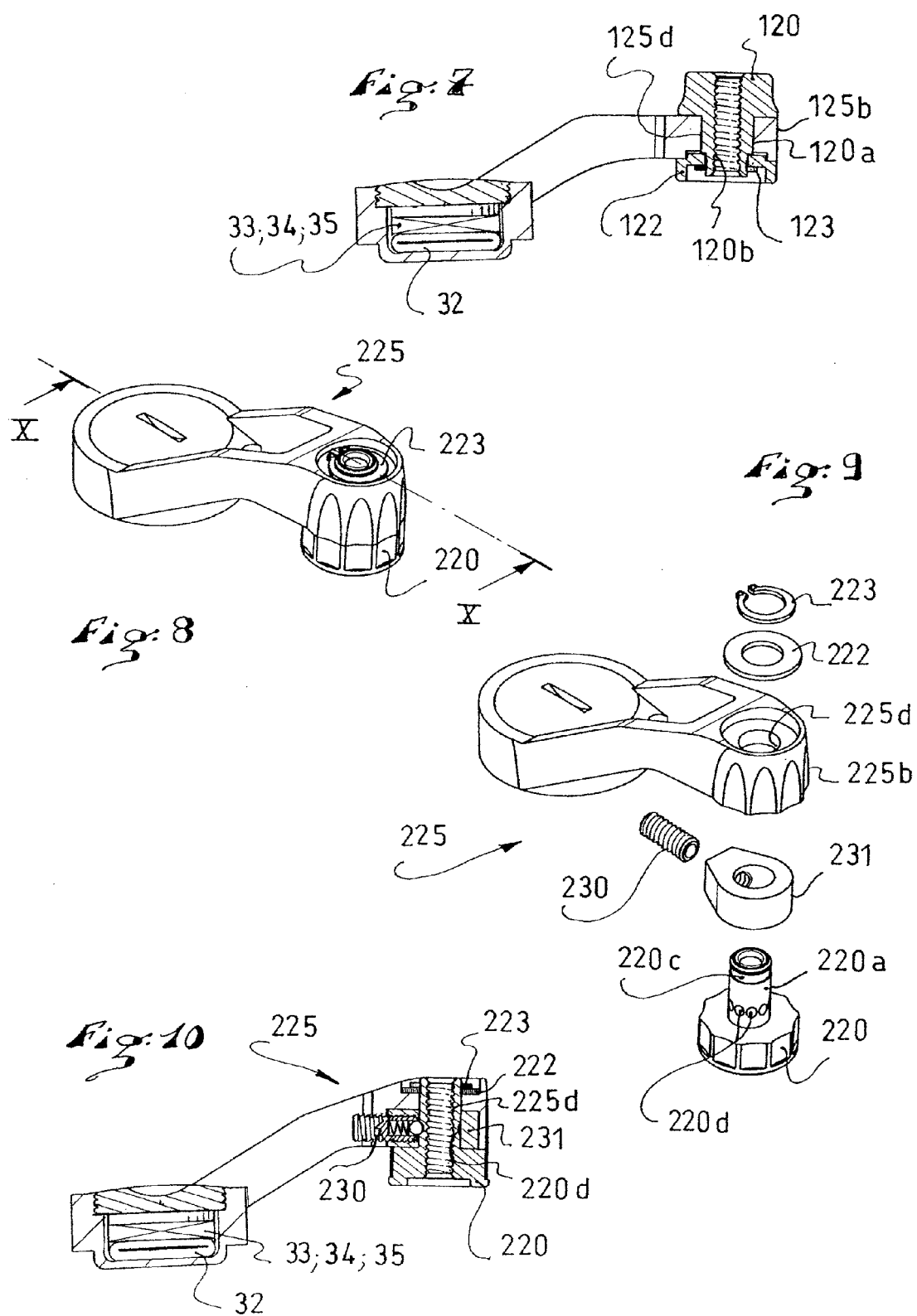

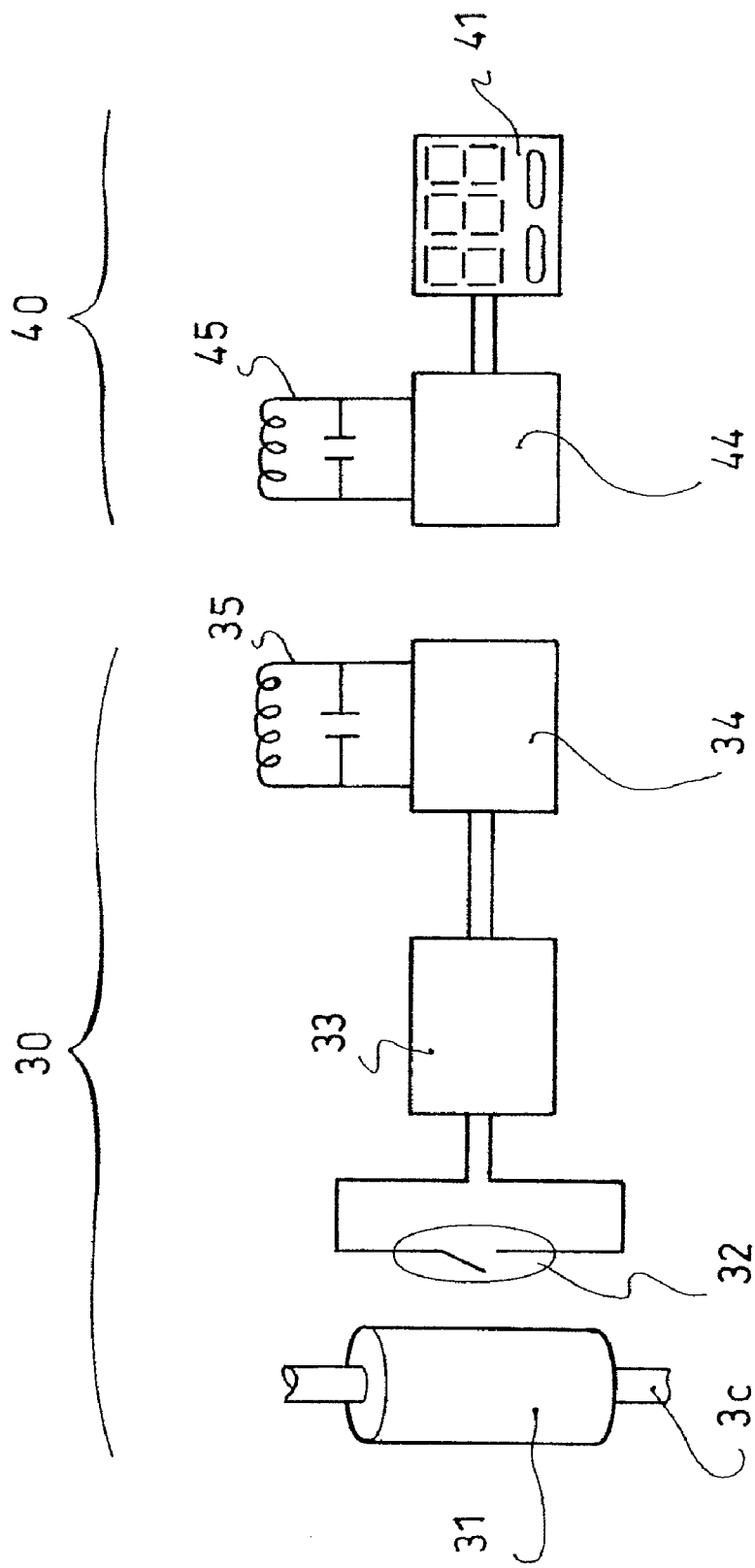

DEVICE FOR MEASURING SPEED, PARTICULARLY FOR CYCLES

CROSS-REFERENCE TO RELATED APPLICATION

This application claims priority under 35 U.S.C. §119 of French Patent Application No. 06.06074, filed on Jul. 3, 2006, the disclosure of which is hereby incorporated by reference thereto in its entirety.

BACKGROUND OF THE INVENTION

1. Field of the Invention

The invention relates to a device for measuring the speed of a vehicle, particularly that of a cycle. In a particular embodiment, the invention is directed to a speedometer for a bicycle.

2. Description of Background and Other Information

Conventionally, a device for measuring the speed of a cycle includes a mechanism for detecting the rotation of a wheel, such device generally constituted by a fixed sensor mounted on a portion of the frame of the cycle and which is able to detect an associated movable sensor fixed on the wheel, and to transmit a corresponding signal, including means for processing the signal as well as means for displaying the user's speed.

It is known from FR 2816277 to house the fixed sensor and the associated signal-processing and transmission circuit in the lever of a quick-locking axle of a wheel.

A wheel locking axle conventionally includes a long threaded rod, which extends through the wheel hub and projects on each side of the hub. One of the ends of the threaded rod has a first tightening abutment, generally adjustable along the rod. This is typically a threaded end piece or a regular screw nut that is screwed onto the threaded end of the rod.

The other end of the rod has a second movable tightening abutment whose movement along the rod is controlled by a lever that is articulated at the end of the axle and includes an eccentric cam. The lever and the cam are used to vary the distance between the two abutments. In particular, they make it possible to tighten, in a single movement, the lugs of for fastening a cycle's fork between the ends of the hub and the abutments for tightening the locking axle.

Three different types of locking axles with different lever mechanisms are known.

Housing the fixed sensor and the associated signal-processing and transmitting circuit in the lever of a quick-locking axle eliminates the need for a separate fixed sensor mounted on the frame. This design is therefore particularly advantageous because supplemental elements, especially for fastening, are unnecessary, and thereby optimizes weight and aerodynamics. It also guarantees the magnet/sensor distance, even after the wheel has been mounted/dismounted numerous times.

A drawback of this design, however, is that the lever of a quick-locking axle is specific to that locking axle and that the levers of different types of wheel-locking axles are not interchangeable. Furthermore, simple wheel-locking axles comprising a mere threaded rod and associated screw nut are not compatible with such a design.

SUMMARY OF THE INVENTION

An object of the present invention is to remedy the aforementioned drawbacks.

More particularly, an object is to provide a speed measurement device that is compatible with standardized elements found on the market.

Another object is to provide an improved and/or less costly speed measurement device.

According to the invention, these objects are achieved in a device for measuring the speed of a vehicle, particularly that of a cycle, including at least one wheel fixed to a frame by means of an axle threaded at at least one end and one screw nut, which is of the type including a mechanism for detecting the rotation of a wheel including a fixed sensor, mounted on a portion of the frame of the cycle, able to detect an associated movable sensor fixed on the wheel and an arrangement to process the signal originating from the fixed sensor in that the fixed sensor and the arrangement that processes the signal originating from the sensor are located in a casing affixed to the screw nut of the wheel fastening axle.

Thus, the fixed sensor and the arrangement to process a signal originating from this element are housed in a standard-type element (that is, provided with a standard threading), namely, the screw nut that is therefore compatible with various types of wheel-locking axles, whether such axles are quick-locking axles or otherwise.

This results in greater interchangeability and/or adaptability to existing mechanisms, as well as greater number of options for repair/replacement in case of a defect or the like on the detection mechanism.

According to a particular embodiment, the casing is rotatably mounted with respect to the screw nut. This advantageously enables an easier orientation of the casing with respect to the fixed sensor.

BRIEF DESCRIPTION OF DRAWINGS

The invention will be better understood and other characteristics thereof will be highlighted from the detailed description that follows, with reference to the annexed drawings, by way of non-limiting examples of several embodiments, and in which:

FIG. 7 is a cross-sectional view along the line VII-VII of FIG. 5;

FIG. 8 is a view similar to that of FIG. 3, of a screw nut according to a third embodiment;

FIG. 9 is an exploded perspective view of the screw nut of FIG. 7;

FIG. 10 is a cross-sectional view along the line X-X of FIG. 8;

FIG. 11 is a schematic view of the various circuits of the speed measurement device according to the invention.

DETAILED DESCRIPTION OF THE INVENTION

Figure 1:
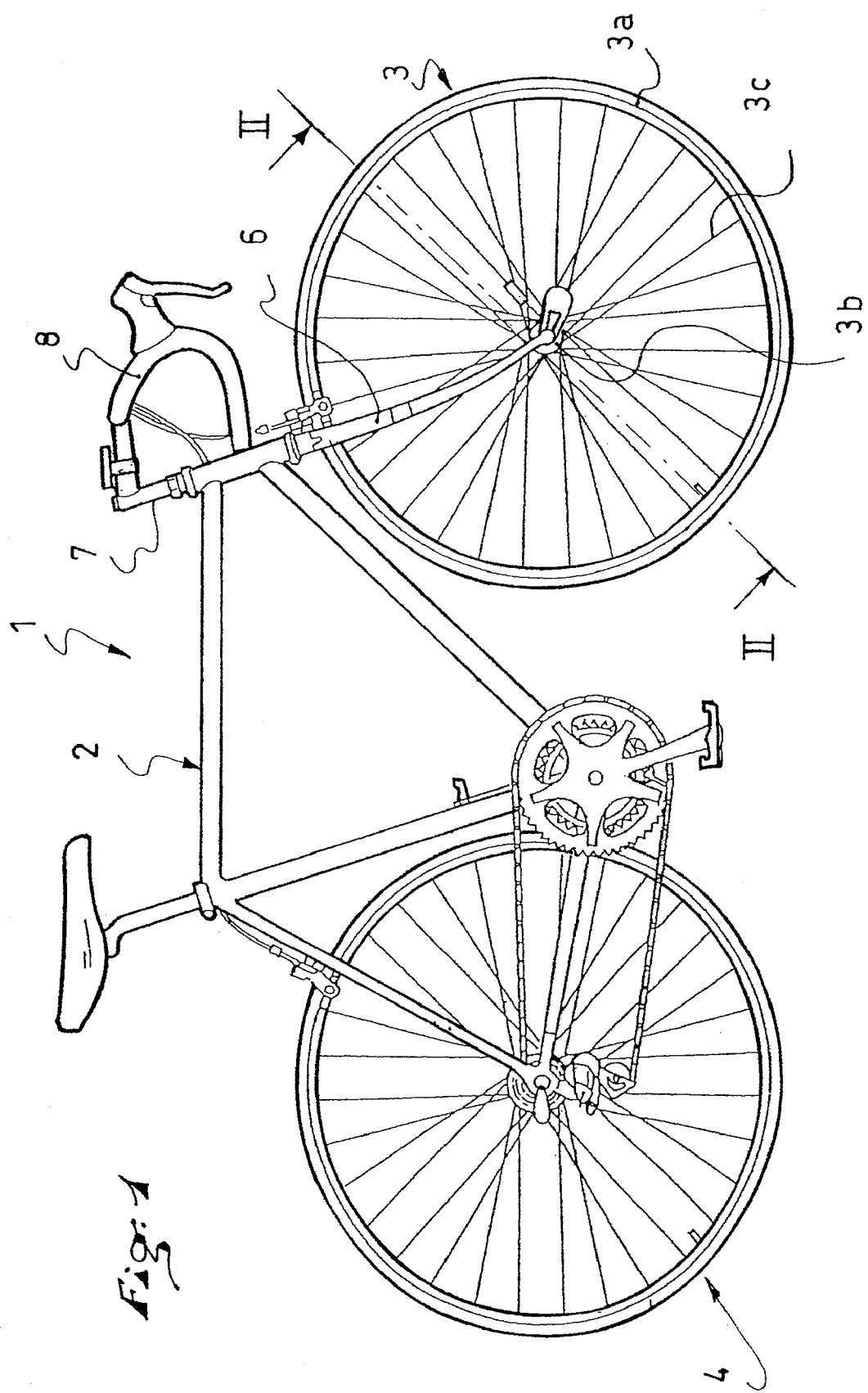
FIG. 1 shows a bicycle provided with the speed measurement device according to the invention.

FIG. 1 shows a cycle, in this case a bicycle 1, which includes a frame 2, a front wheel 3, and a rear wheel 4, the front wheel 3 being assembled at the end of the fork 6 connected to handlebars 8 of the frame by a stem 7. The following description will more greatly focus on the front wheel, which, in the example shown, is associated with the speed measurement device. However, the speed measurement device could be associated, alternatively, with the rear wheel, or the cycle could include only a single wheel. The front wheel 3 conventionally includes a rim 3a, a hub 3b, and spokes 3c connecting the rim 3a and the hub 3b.

Figure 2:
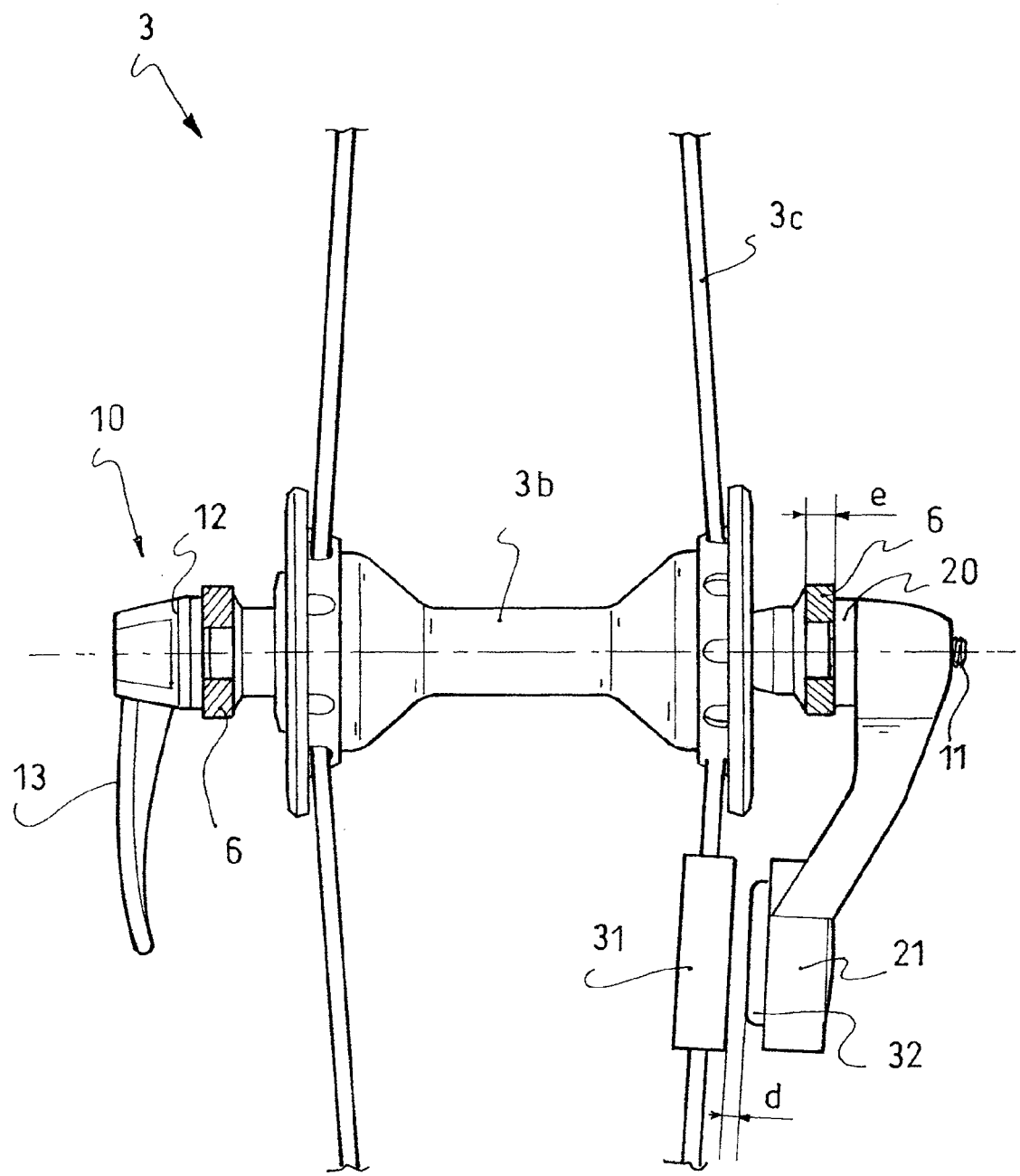
FIG. 2 is a partial, cross-sectional view along the line II-II of FIG. 1.

As shown more particularly in FIG. 2, the front wheel 3 is assembled to the fork 6 by means of a quick-locking axle, or quick-locking assembly or mechanism, 10, sometimes referred to as quick-release axle, assembly, or mechanism. The quick-locking mechanism 10 is conventionally made of a longitudinal threaded rod 11, or skewer, which extends through the hub 3b, and which holds, at a first end, a screw nut 20 screwed onto the end of the rod 11 and, at a second end, a movable tightening abutment 12, whose movement along the rod is controlled, in a known manner, by an articulated lever 13. The expression "quick-locking axle," as used herein, therefore, encompasses any of the constructions mentioned, including assemblies and mechanisms that include, e.g., a threaded rod or a skewer, such as those which includes a threaded end.

A quick-locking axle 10 can be a known locking element that can have any of various designs for the mechanism of its lever 13. Therefore, it has not been described in greater detail herein. Furthermore, the present invention can also apply to a simple locking mechanism made of a simple threaded rod provided with a fixed abutment and a crown nut, or acorn nut, cooperating with the threaded rod.

As shown in FIG. 2, the role of a wheel-locking axle is to enable a wheel to be mounted on the frame of a bicycle, in this case on the fork 6 for the front wheel 3.

According to the invention, the cycle 1 is equipped with a speed measurement device. The speed measurement device, schematically shown in FIG. 11, generally includes, in a known manner, a sensor/transmitter portion 30 and a receiver/display portion 40.

The sensor/transmitter portion 30 includes a movable sensor element, in this case a magnet 31, fixed on one of the spokes 3c of the wheel 3 and adapted to cooperate with a fixed sensor 32, for example a reed switch, or bulb, as shown, for detecting the passing of the magnet 31 at each revolution of wheel.

The sensor elements 31, 32 can be of a different type, such as, for example, an optical detection mechanism equipped with a diode detecting the passing of a reflective strap or band on a spoke.

The fixed sensor 32 is mounted on the frame of the cycle or on an element affixed to the latter.

In the example shown, the speed measurement device is of the wireless type. Therefore, the fixed sensor 32 is associated with a processing circuit 33 adapted to transform the signal originating from the sensor 32 and a transmitter circuit 34 with an antenna 35, for transmitting the signal originating from the fixed sensor 32. This circuit draws energy from a battery (not shown in FIG. 11). The signal transmitted by the transmitter 34 and its antenna 35 is transmitted toward the receiver/display 40 portion, which includes an antenna 45 that receives the signal transmitted by the other antenna, a processing circuit 44, which processes the transmitted signal, and a display circuit 41.

The receiver/display 40 circuit assembly forms a central unit having a display that the user mounts on the frame so as to be visible and, for example, on the stem 7 or the handlebars 8. In another exemplary, non-limiting, embodiment, the structure of the transmitting apparatus 30 and the receiving/display apparatus 40 could include the that which is disclosed in U.S. Pat. No. 5,170,161, the disclosure of which is hereby incorporated by reference thereto in its entirety, which patent discloses a transmitting apparatus 28 and a receiving apparatus 30, the former including components such as a reed switch, multivibrators, oscillating circuit, and transmitting coil, the latter including components such as a receiving coil, multivibrators, microcomputer, and display.

The invention can alternatively apply to a speed measurement device in which data transmission is carried out via wire, and thus without a transmitter/receiver system. The invention could also apply to a speed measurement device having only the sensor portion and processing circuit, without the display portion 40.

According to the invention, the fixed portion of the sensor/transmitter 30 circuit, that is, the fixed sensor 32 and the circuits and antenna 33, 34, 35 for processing the signal originating from the fixed sensor element 32, as well as the battery, are housed in a casing 21 affixed to the screw nut 20 of the fastening or quick-locking axle 10 of the wheel 3. In a particular embodiment, such as in the case of wire transmission, only the fixed sensor and its battery are housed in the casing. Thus, only two components of the device are housed in the casing. It is conceivable, in such an embodiment, the battery could be mounted elsewhere, such as elsewhere on an element fixed to the casing 21, such as on or within the angled arm 25, described further below, to which the casing 21 is affixed, which arm is secured to the threaded rod 11. In such a case, although conceivably, also with a wireless embodiment, only one component of the device is housed in the casing.

Figure 3:
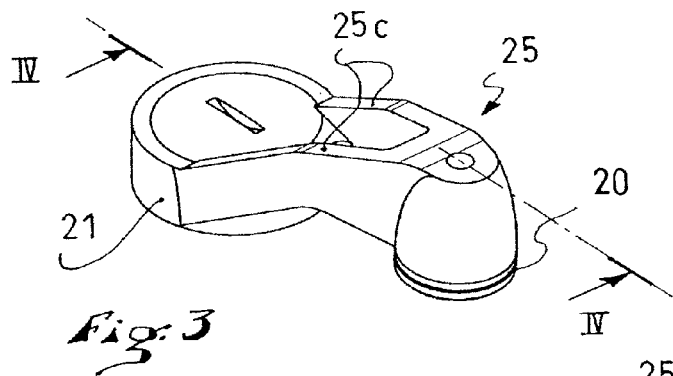
FIG. 3 is a perspective view of a screw nut according to a first embodiment of the invention.
Figure 4:
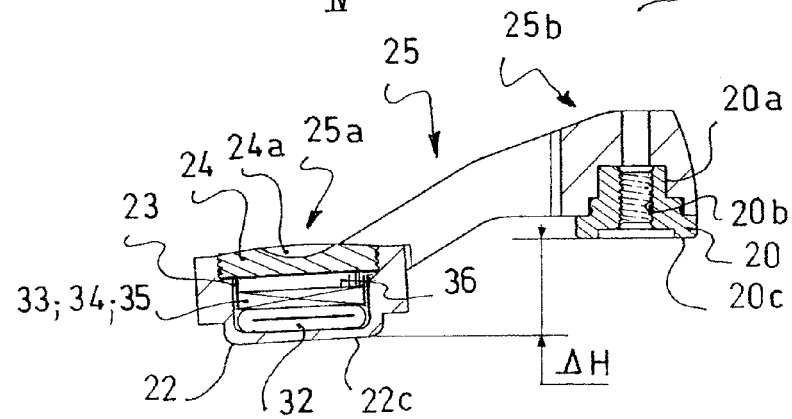
FIG. 4 is a cross-sectional view along the line IV-IV of FIG. 3.

In the example shown in FIGS. 2, 3, and 4, the casing 21 is cylindrical with a projecting portion 22 inside which the fixed sensor 32 is housed, whereas the elements 33, 34, 35 of the circuit for processing the associated signal, as well as a battery 36, are housed in a recess 23 of the cylindrical portion of the casing.

The recess 23 is closed by a lid 24, provided with a slot 24a, that can be removed with an associated tool. The lid 24 is retained in a known manner, such as by ratchet engagement or with screw-thread engagement, as shown in the drawing.

This construction makes it easy for access to the inside of the casing 21, for example, to replace the battery 36 or one of the components of the sensor/transmitter 30 circuit.

In an alternative construction, the circuit is entirely embedded within the casing.

In the example shown, the casing 21 is made of a non-metallic material, for example a plastic material such as polyamide, so as not to hinder the electromagnetic transmission.

As shown in FIGS. 2 to 4, the casing 21 is fastened to a first end 25a of the angled arm 25 radially extending from the screw nut 20. In fact, and as shown particularly in FIG. 4, the screw nut 20 is fixed inside a slightly truncated portion of a second end 25b of the angled arm 25. Although the term "arm" is used herein as that which supports the casing 21, any structural element which supports and spaces the casing 21 from the axle/rod 11 to a position for sensing the sensor element 31 is encompassed within the meaning of the term "arm." In addition, although the casing 21 is described with reference to the particular illustrated embodiments as being fixed or attached to the arm, the casing can be considered, within the meaning of such description, a recess of such arm.

The screw nut 20 is fitted inside the end 25b, such as being force-fitted therein, and includes flat portions 20a to prevent any relative rotation with respect to the arm 25. The casing 21 is thereby fixedly mounted with respect to the screw nut 20.

The casing 21 is thereby constrained for rotatable adjustment around the axis of the axle/rod 11.

The screw nut 20 also includes internal threads 20b adapted to cooperate with the threads of the rod 11. The threading is, for example, an M5 threading, which is standard in most quick-locking axles.

As shown in FIG. 4, the angled arm 25 defines a setback, or a height difference, ΔH between a lower surface or support surface 20c of the screw nut and the lower surface 22c of the casing projection 22.

This height ΔH is greater than the thickness e of the arms of the fork 6 in the considered area. In other words, the setback of the angled arm 25 corresponds at least to the end of an arm of a fork of the cycle. Conventionally, this height ΔH is between 10 millimeters (mm) and 20 mm so as to accommodate the size of any of a greater number of forks.

This construction enables a user of the invention to compensate for the various stackings in the wheel-to-fork fastening area and ensures the fixed sensor 32 is as close to the movable magnet 31 as possible, which provides optimum conditions for sensing the rotation of the wheel.

According to a particular embodiment, the distance d between a magnet 31 and the sensor 32 is between 1 mm and 20 mm (see FIG. 2).

Arranging the fixed portion of the sensing circuit/transmitting circuit inside a casing affixed to the screw nut 20 of the locking axle enables a better standardization and compatibility with all commercially available quick-locking axles, or non-quick-locking axles. Different screw nuts with different threadings can alternatively be provided for compatibility with all the wheel locking axles available on the market.

In the example shown in FIGS. 2 and 3, the angled arm 25 is recessed in its center, forming two convergent arms 25c. This construction is very advantageous as it enables the weight of the assembly to be reduced. Alternatively, the arm 25 can be a unitary piece, i.e., made as a single piece of material, for reasons of aesthetics, strength, or both, for example.

FIGS. 5 to 7 and 8 to 10, respectively, illustrate other embodiments of the screw nut, in which the same elements or similar elements relative to the screw nut are designated by the same reference numerals, increased by 100, the only differences relating to the structure and mounting of the screw nut.

Figure 5:
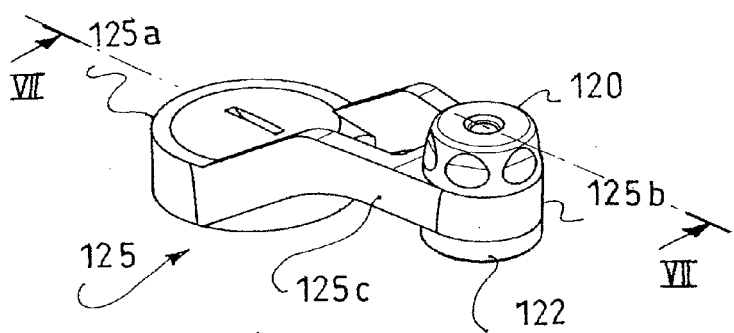
FIG. 5 is a view similar to that of FIG. 3, of a screw nut according to a second embodiment.
Figure 6:
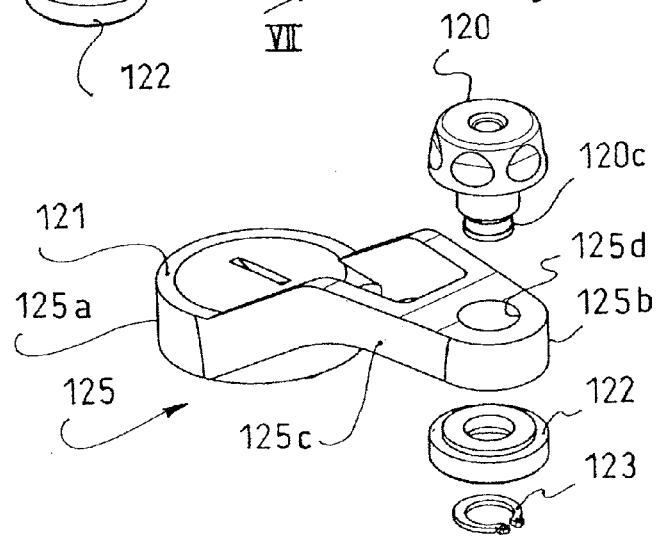
FIG. 6 is an exploded perspective view of the screw nut of FIG. 5.

In the case of FIGS. 5 to 7, the casing 121 including the fixed sensor/transmitter assembly 32, 33, 34, 35, is fastened to the first end 125a of an angled arm 125 radially extending from the screw nut 120.

The only difference with respect to the previous embodiment is that the screw nut 120 is movably mounted in rotation with respect to the arm 125.

In this case, the end 125b of the arm 125 receiving the screw nut has the shape of a ring provided with a hole 125d inside of which a cylindrical portion 120a of the screw nut is mounted with a clearance. The screw nut 120 is fastened to the end 125b by means of a supporting washer 122 and a spring retaining ring 123 cooperating with a groove 120c provided on the cylindrical portion 120a of the screw nut. The screw nut 120 can thereby turn freely with respect to the arm 125 and vice versa.

In other words, once the screw nut 120 has been screwed into position for locking the wheel, the arm 125 can pivot with respect to the screw nut, i.e., while being constrained for adjustable rotation about the axle/rod 11, and the assembly can thereby be given a more aerodynamic and aesthetic orientation with respect to the wheel.

FIGS. 8 to 10 feature another embodiment in which the arm 225 is also rotatably mounted with respect to the screw nut 220.

In this case, the end 225b of the arm 225 receiving the screw nut also has the shape of a ring provided with a hole 225d inside which a cylindrical portion 220a of the screw nut is housed with a clearance. The screw nut 220 is retained on the arm 225 by means of a washer 222 and a spring retaining ring 223 cooperating with a groove 220c of its cylindrical portion 220a.

The difference with the previous case resides in the provision of indexing mechanism in the form of a thrust ball bearing 230 fixedly mounted on the arm 225 by means of a washer 231, through which the threaded portion of the bearing 230 is engaged, and cooperating elastically (see the cross-sectional view of FIG. 10, e.g.) with associated indentations 220d of the screw nut 220.

This construction thereby enables a relative rotation of the arm 225 with respect to the screw nut, i.e., constrained for adjustable rotation about the axle/rod 11, such rotation being indexed by an amount set by the thrust ball bearing and associated indentations.

The present invention is not limited to the particulars of the embodiments hereinabove described by way of non-limiting examples, but rather encompasses all similar or equivalent embodiments.

The invention claimed is:

1. A device for measuring speed of a cycle, the cycle having a frame and at least one wheel fastened for rotation relative to a frame by means of a fastening axle threaded at least at one end, said device comprising: a wheel rotation detection mechanism comprising:
   a fixed sensor adapted to be mounted on a portion of the frame of the cycle, said sensor being adapted to detect passing of a movable sensor element fixed for movement with the wheel of the cycle and to generate a signal representative of said passing of
   the movable sensor element;
   a signal processor to process the signal generated by the fixed sensor;
   a screw nut internally threaded for threaded engagement with a threaded rod end of the at least one threaded end of the fastening axle of the wheel;
   a casing, said casing housing at least one of the fixed sensor and the signal processor, the casing being affixed to the screw nut of the fastening axle of the wheel.

2. A device according to claim 1, wherein:
   an arm extends radially from the screw nut;
   the casing is fixed to an end of the arm.

3. A device according to claim 2, wherein:
   the arm has a setback adapted to correspond to at least a thickness of an end of a fork to which the wheel is to be mounted.

4. A device according to claim 1, wherein:
   the casing is fixedly mounted to the screw nut against rotation relative to the screw nut.

5. A device according to claim 1, wherein:
   the casing is adjustably rotatably mounted with respect to the screw nut.

6. A device according to claim 5, wherein:
   the rotation of the casing with respect to the screw nut is free, non-indexed rotation.

7. A device according to claim 5, further comprising:
   an indexing mechanism providing for the rotation of the casing with respect to the screw nut being an indexed rotation.

8. A device according to claim 1, further comprising:
a signal transmitter to transform the signal originated by the fixed sensor and transmit the transformed signal in a direction of a receiver.

9. A device according to claim 1, wherein:
both the fixed sensor and the signal processor are housed within the casing.

10. A device for measuring speed of a cycle, the cycle having a frame, at least one wheel, and a fastening axle about which the wheel is adapted to rotate, said device comprising:
a nut having internal threads for threaded engagement with a threaded end of the axle;
an arm fixed for rotation with the nut about an axis of the axle for being supported on the axle and constrained for rotatable adjustment only around the axis of the axle when supported on the axle until tightened;
a casing adapted to be supported by the arm at a distance from the axle;
a fixed sensor adapted to detect and to generate a signal representative of a passing of a movable sensor element fixed to the wheel of the cycle; said fixed sensor being housed within said casing.

11. A device according to claim 10, further comprising:
a signal processor to process the signal generated by the fixed sensor, the signal processor being housed within the casing.

12. A device according to claim 11, wherein:
the device is a wireless device, said wireless device further comprising:
a transmitter housed in said casing;
a receiver and a display, said receiver and display adapted to be mounted to the cycle in a position spaced from the casing.

13. A device according to claim 10, further comprising:
the nut, adapted to be threadedly received on the threaded portion of the axle;
the casing being fixed to the nut.

14. A device according to claim 13, wherein:
the casing is fixedly mounted to the nut against rotation relative to the nut.

15. A device according to claim 13, wherein:
the casing is adjustably rotatably mounted with respect to the nut.

16. A device according to claim 15, wherein:
the rotation of the casing with respect to the nut is free, non-indexed rotation.

17. A device according to claim 15, further comprising:
an indexing mechanism providing for the rotation of the casing with respect to the nut being an indexed rotation.

18. A device according to claim 1, further comprising:
the movable sensor.

19. A device according to claim 1, further comprising:
the fastening axle having a first end and a second end, the first end of the fastening axle being the threaded end;
a movable abutment movable relative to the second end of the fastening axle, the movable abutment being structured and arranged, by movement toward the screw nut, to tighten the wheel to the frame and to tighten the wheel rotation detection mechanism to the frame.

20. A device according to claim 19, further comprising:
an articulated lever articulated relative to the movable abutment;
said articulated lever, said fastening axle, and said screw nut constituting a quick-release mechanism for selectively locking and releasing the wheel and the wheel rotation detection mechanism to the frame.

21. A device according to claim 19, wherein:
the second end of the fastening axle being a threaded end;
the movable abutment comprises a nut threadedly engageable with the threaded second end of the fastening axle.

22. A device according to claim 10, further comprising:
the movable sensor.

23. A device according to claim 10, further comprising:
the fastening axle having a first end and a second end, the first end of the fastening axle being the threaded end;
a movable abutment movable relative to the second end of the fastening axle, the movable abutment being structured and arranged, by movement toward the screw nut, to tighten the wheel to the frame and to tighten the wheel rotation detection mechanism to the frame.

24. A device according to claim 23, further comprising:
an articulated lever articulated relative to the movable abutment;
said articulated lever, said fastening axle, and said screw nut constituting a quick-release mechanism for selectively locking and releasing the wheel and the wheel rotation detection mechanism to the frame.

25. A device according to claim 23, wherein:
the second end of the fastening axle being a threaded end;
the movable abutment comprises a nut threadedly engageable with the threaded second end of the fastening axle.

* * * * *